106. COMPOSITIONS, COATING OR PLASTIC
84

Cross Reference 1,307,197

Examiner

UNITED STATES PATENT OFFICE.

HUGO HENRY HANSON, OF BOSTON, MASSACHUSETTS, AND HUGH KELSEA MOORE, OF BERLIN, NEW HAMPSHIRE, ASSIGNORS TO BERLIN MILLS COMPANY, OF BERLIN, NEW HAMPSHIRE, A CORPORATION OF MAINE.

MAGNESIA BRICK AND METHOD OF MAKING THE SAME.

1,307,197.      Specification of Letters Patent.     Patented June 17, 1919.

No Drawing.     Application filed May 11, 1915. Serial No. 27,417.   106-58

*To all whom it may concern:*

Be it known that we, HUGO HENRY HANSON, a subject of the King of Sweden, and a resident of Boston, in the county of Suffolk and State of Massachusetts, and HUGH KELSEA MOORE, a citizen of the United States, and a resident of Berlin, in the county of Coos and State of New Hampshire, have invented certain new and useful Improvements in Magnesia Bricks and Methods of Making the Same, of which the following is a specification.

This invention has relation to the production of fire-resistant bricks capable of utilization in those furnaces in which there is a production of fused alkali, such, for instance, as used in the recovery of soda in the form of sodium sulfid, sodium carbonate, etc., in the manufacture of sulfate or soda pulp.

The object of the invention is to provide a brick which is practically non-porous, which is substantially basic in composition, and in which the expansion when heated to relatively high temperatures is comparatively *nil*.

In accomplishing these objects, we employ a body consisting of magnesia. This may in practical use consist of calcined magnesite either of the Styrian or Grecian variety, or we may utilize ordinary commercial magnesia bricks crushed and ground for the purpose. This body, which is alkaline, has added thereto a certain proportion of silica-bearing material such as aluminum silicate or silica, which in practice may take the form of fire clay for a purpose which will be subsequently explained. These two substances are thoroughly mixed and have added thereto any suitable binder for temporarily binding the particles together. In practice, we may use a small quantity of water, and, if desired, a small portion of sodium silicate. A sufficient quantity of the binder is utilized to form a mass which will be more or less coherent. The mass is then shaped into the form of bricks, of any suitable dimensions which are subjected to high pressure. After being dried, the bricks are subjected to a heat which is sufficient to cause a slagging action to take place between the magnesia and the silicate. The temperature, at which this action takes place, varies with the proportion of the silicate. Care must be taken not to expose the bricks to such temperature as will cause them to become so fluid as to run. On removing the bricks and permitting them to cool, it would be found that they present a homogeneous, densely compacted, slaglike structure which is substantially non-porous, and which has a low coefficient of expansion.

In actual practice, we find that the best results may be secured by utilizing magnesia particles which are graded in size. For example, the body may consist of a mixture of 15% of relatively large particles such for instance as will pass through a 20-mesh sieve and be caught on a 30-mesh sieve; 35% of particles passing through a 50-mesh sieve and caught on a 60-mesh sieve; 35% of particles passing through a 100-mesh sieve and caught on a 120-mesh sieve; and 15% of particles passing through a 150-mesh sieve and caught on a 200-mesh sieve. Of course these proportions may be varied and are merely given as a guide to be used intelligently in carrying out the process to get the best results.

As is well known, calcined magnesite contains a small variable proportion of impurities such as aluminum silicate, iron oxid, calcium oxid, and the like. This proportion of impurities causes a slight sintering action to take place when the magnesite is heated to high temperatures. We, however, add a sufficient proportion of the aluminum silicate or silica in order to cause a slagging action at a temperature sufficiently above that to which the bricks are subjected in ordinary use to prevent their being affected by the working temperatures. Preferably we add a proportion of the silicate or silica which will vary from 10% to 20% of the entire mixture. The amount of silicate or silica which is added may depend upon the proportion in which the silicate is present in the raw calcined magnesite.

As an example of the method of making our product, the following steps may be taken:—To a quantity of calcined magnesite, in which the particles are graded from coarse to fine substantially as previously described, and containing approximately 1% of $SiO_2$, 17% thereof by weight of fire clay may be added. This mixture is placed in a pug mill and a small quantity of water and sodium silicate is added and the mass is thoroughly mixed. The mass is then formed into bricks, which, by means of suitable molds and pressing apparatus, are subjected to a pressure of approximately 6 tons per square inch to densely compact them. They are then permitted to dry and are then placed in a suitable furnace, such, for example, as an electric furnace, and are subjected to a heat of approximately 1600° C. Under the action of the heat, the mass in each brick slags, becoming slightly plastic but not sufficiently so as to lose its shape. The bricks are then removed or permitted to cool, and are ready for use.

While magnesia bricks, formed as herein described, may be used for a variety of purposes, we find them particularly applicable for use in soda recovery furnaces in which the soda is recovered in the form of sulfid, carbonate, sulfate, etc. During the slagging action, the acid of the silicate or silica is neutralized by the magnesia so that the bricks are neutral with respect to the alkaline effluent of the furnace. The coefficient of expansion is extremely low so that the bricks may be heated to relatively high temperatures without deleterious effects, and, being substantially non-porous, do not absorb the molten soda. Where relatively porous bricks are utilized, followed by an absorption of the molten soda, on permitting the furnace to cool and then reheating it again, the bricks are disintegrated by the expansion of the soda and the chemical action which takes place. This is prevented by making the bricks substantially non-porous as herein described.

As a result of the procedure herein set forth, we produce bricks which consist of a dense, substantially non-porous, homogeneous slag having an extremely low coefficient of expansion and a high melting point. When silica alone is employed in the mixture, the slagging action takes place at approximately 1500° C., but when aluminum silicate is used, the slagging temperature is approximately 1600° C. We employ the term slagging as meaning the action of incomplete fusion, in which, however, the fusion is more complete than in sintering. The slagging action, we have found in practice, produces a brick, which, when compared with the ordinary magnesia brick, will not become saturated with molten alkali or disintegrate or easily wear out, where under the same conditions, the ordinary magnesia bricks disintegrate and soon wear to destruction.

While, in the claims we refer to "silica", it will be understood that we regard a suitable silicate as the equivalent thereof.

We claim:—

1. The herein described method of making fire bricks, which consists in mixing magnesia and a silica-bearing material and a temporary adhesive binder in the proportion of about 17% of silica-bearing material to 83% of magnesia, forming the mixture into bricks, and heating the bricks to a temperature of approximately 1600° C. to cause a slagging action to occur.

2. The herein described method of making fire bricks, which consists in mixing magnesia and silica-bearing material and sodium silicate, forming the mixture into bricks, compacting the bricks by high, direct pressure, and heating the same to a temperature at which the magnesia and the silica slag.

3. The herein described method of making fire bricks, which consists of mixing about 83% graded particles of magnesia together with about 17% of fire clay and sodium silicate, forming the mass into bricks, compacting the bricks by direct, high pressure, heating the bricks to a temperature at which said materials become plastic and a slagging action takes place without the bricks losing their shape, thus permitting the bricks each to cool to a dense, substantially non-porous, homogeneous neutral slag.

In testimony whereof we have affixed our signatures.

HUGO HENRY HANSON.
HUGH KELSEA MOORE.